United States Patent
Tsukahara et al.

(10) Patent No.: US 11,339,280 B2
(45) Date of Patent: May 24, 2022

(54) POLYPROPYLENE COMPOSITION AND MOLDED ARTICLE

(71) Applicant: BASELL POLIOLEFINE ITALIA S.R.L., Milan (IT)

(72) Inventors: Takeshi Tsukahara, Kanagawa (JP);
Nobuyuki Tsurumi, Kanagawa (JP);
Shitoshi Kanno, Kanagawa (JP);
Kunio Yamamoto, Kanagawa (JP);
Takeshi Nakajima, Kanagawa (JP)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/981,217

(22) PCT Filed: Mar. 15, 2019

(86) PCT No.: PCT/JP2019/012287
§ 371 (c)(1),
(2) Date: Sep. 15, 2020

(87) PCT Pub. No.: WO2019/177179
PCT Pub. Date: Sep. 19, 2019

(65) Prior Publication Data
US 2021/0017367 A1 Jan. 21, 2021

(30) Foreign Application Priority Data
Mar. 16, 2018 (JP) .............................. JP2018-050025

(51) Int. Cl.
*C08L 23/16* (2006.01)
*C08L 23/14* (2006.01)
*C08L 23/08* (2006.01)

(52) U.S. Cl.
CPC .............. *C08L 23/14* (2013.01); *C08L 23/08* (2013.01); *C08L 23/16* (2013.01); *C08L 2207/062* (2013.01)

(58) Field of Classification Search
None
See application file for complete search history.

(56) References Cited

FOREIGN PATENT DOCUMENTS

| | | |
|---|---|---|
| EP | 0472946 A2 | 3/1992 |
| EP | 1279699 A1 | 1/2003 |
| EP | 2338656 A1 | 6/2011 |
| EP | 2592112 A1 | 5/2013 |
| EP | 2746295 A1 | 6/2014 |
| WO | 2012081667 A1 | 6/2012 |

OTHER PUBLICATIONS

International Search Report and Written Opinion dated Jul. 15, 2019 (dated Jul. 15, 2019) for Corresponding PCT/JP2019/012287.

*Primary Examiner* — Richard A Huhn

(57) ABSTRACT

A polypropylene composition made from or containing:
(i) component (1) made from or containing a propylene/ethylene copolymer containing more than 1.5% by weight and not more than 4% by weight of an ethylene-derived unit;
(ii) component (2) made from or containing an ethylene/propylene copolymer containing 65 to 87% by weight of an ethylene-derived unit; and
(iii) 0.01 to 0.5 parts by weight of a crystal nucleating agent, based on a total of 100 parts by weight of component (1) and component (2);
wherein the polypropylene composition has
1) weight ratio of component (1) to component (2) is in the range of 80:20 to 90:10,
2) intrinsic viscosity of xylene solubles (XSIV) in the range of 0.8 to 1.4 dl/g,
3) MFR (at 230° C. under a load of 2.16 kg) in the range of 5 to 15 g/10 min.,
4) viscosity ratio in the range of 0.40 to 0.80 where $$\text{Viscosity ratio} = \frac{XSIV}{\text{Intrinsic viscosity of component (1)}}.$$

5 Claims, No Drawings

US 11,339,280 B2

POLYPROPYLENE COMPOSITION AND MOLDED ARTICLE

This application is the U.S. National Phase of PCT International Application PCT/JP2019/012287, filed Mar. 15, 2019, claiming benefit of priority to Japanese Patent Application No. 2018-050025, filed Mar. 16, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to polypropylene compositions and molded articles thereof.

BACKGROUND OF THE INVENTION

It is believed that polypropylene is useful in food containers because of polypropylene's physical and hygienic properties. In some instances, polypropylene containers have poor in impact resistance at low temperatures. In some instances, polypropylene containers should have sufficient transparency to reveal the contents of the containers as well as stiffness for shape stability. As such, polypropylene should have a good balance between transparency, impact resistance at low temperatures, and stiffness.

SUMMARY OF THE INVENTION

[1] In general embodiments, the present disclosure provides a polypropylene composition made from or containing:
 (i) component (1) made from or containing a propylene/ethylene copolymer containing more than 1.5% by weight and not more than 4% by weight of an ethylene-derived unit, based upon the total weight of the propylene/ethylene copolymer;
 (ii) component (2) made from or containing an ethylene/propylene copolymer containing 65 to 87% by weight of an ethylene-derived unit, based upon the total weight of the ethylene/propylene copolymer; and
 (iii) 0.01 to 0.5 parts by weight of a crystal nucleating agent, based on a total of 100 parts by weight of component (1) and component (2);
 wherein the polypropylene composition has
 1) a weight ratio of component (1) to component (2) in the range of 80:20 to 90:10,
 2) an intrinsic viscosity of xylene solubles (XSIV) in the range of 0.8 to 1.4 dl/g,
 3) a MFR (at 230° C. under a load of 2.16 kg) in the range of 5 to 15 g/10 min.,
 4) as determined by the following equation, a viscosity ratio in the range of 0.40 to 0.80:

$$\text{Viscosity ratio} = \frac{XSIV}{\text{Intrinsic viscosity of component (1)}}.$$

[2] In some embodiments, the ethylene-derived unit in component (1) is present at a concentration of 1.8 to 4% by weight, based upon the total weight of the propylene/ethylene copolymer.

[3] In some embodiments, the viscosity ratio is in the range of 0.45 to 0.75, alternatively 0.50 to 0.70.

[4] In some embodiments, components (1) and (2) are copolymers obtained by polymerizing propylene and ethylene using a catalyst made from or containing:
 (a) a solid catalyst made from or containing magnesium, titanium, a halogen, and an electron donor compound selected from succinate-based compounds,
 (b) an organoaluminum compound and
 (c) optionally an external electron donor compound.

[5] In some embodiments, the present disclosure provides an injection-molded article made from or containing the polypropylene composition.

DETAILED DESCRIPTION OF THE INVENTION

As used herein, numerical ranges defined as "X to Y" include both endpoints X and Y.

1. Polypropylene Composition

In some embodiments, the present disclosure provides a polypropylene composition made from or containing
 (i) component (1) made from or containing a propylene/ethylene copolymer containing more than 1.5% by weight and not more than 4% by weight of an ethylene-derived unit, based upon the total weight of the propylene/ethylene copolymer;
 (ii) component (2) made from or containing an ethylene/propylene copolymer containing 65 to 87% by weight of an ethylene-derived unit, based upon the total weight of the ethylene/propylene copolymer; and
 (iii) a crystal nucleating agent.

(1) Component (1)

In some embodiments, component (1) is made from or containing a propylene/ethylene copolymer containing more than 1.5% by weight of an ethylene-derived unit, based upon the total weight of the propylene/ethylene copolymer. As used herein, a propylene/ethylene copolymer containing 1.5% by weight of an ethylene-derived unit refers to a copolymer made from or containing an ethylene-derived unit and a propylene-derived unit at a weight ratio of 1.5:98.5. A person of ordinary skill in the art is to understand other copolymers in the same way. In some embodiments, the upper limit of the ethylene-derived unit content in component (1) is not more than 4% by weight, alternatively not more than 3.8% by weight, based upon the total weight of the propylene/ethylene copolymer. When this content exceeds the upper limit, not only a decrease in transparency occurs, but also polymer particles charged in polymerization plant equipment become easy to adhere to each other or to an inner wall of the equipment, thereby leading to difficulty in production. Further, a decrease in stiffness arises. In some embodiments, the lower limit of the ethylene-derived unit content in component (1) is more than 1.5% by weight, alternatively not less than 1.8% by weight, based upon the total weight of the propylene/ethylene copolymer. When this content falls below the lower limit, a decrease in transparency and low temperature impact resistance occurs. In some embodiments, component (1) is a random copolymer. In some embodiments, the MFR of component (1) is in the range of 6 to 15 g/10 min.

(2) Component (2)

In some embodiments, component (2) is made from or contains an ethylene/propylene copolymer containing 65 to 87% by weight of an ethylene-derived unit, based upon the total weight of the ethylene/propylene copolymer. In some embodiments, the upper limit of the ethylene-derived unit content in component (2) is not more than 87% by weight, alternatively not more than 86% by weight, based upon the total weight of the ethylene/propylene copolymer. When this content exceeds the upper limit, a decrease in transparency and low temperature impact resistance occurs. In some embodiments, the lower limit of the ethylene-derived unit content in component (2) is not less than 65% by weight, alternatively not less than 68% by weight, alternatively not less than 69% by weight. When this content falls below the lower limit, a decrease in transparency occurs.

(3) Crystal Nucleating Agent

In some embodiments, the polypropylene composition contains a crystal nucleating agent. As used herein, the term "crystal nucleating agent" refers to an additive used to improve stiffness by increasing a crystallization rate and transparency by controlling to decrease the size of a crystalline component in a resin. In some embodiments, the crystal nucleating agent is selected from organic nucleating agents. In some embodiments, the organic nucleating agents are selected from the group consisting of nonitol nucleating agents, sorbitol nucleating agents, phosphoric ester nucleating agents, triaminobenzene derivative nucleating agents, metal carboxylate nucleating agents, xylitol nucleating agents, and rosin-based nucleating agents. In some embodiments, the nonitol nucleating agents are selected from the group consisting of 1,2,3-trideoxy-4,6:5,7-bis-[(4-propylphenyl)methylene]-nonitol. In some embodiments, the sorbitol nucleating agents are 1,3:2,4-bis-o-(3,4-dimethylbenzylidene)-D-sorbitol. In some embodiments, the phosphoric ester nucleating agents are selected from the group consisting of aromatic phosphoric ester nucleating agents. In some embodiments, the aromatic phosphoric ester nucleating agents are selected from the group consisting of phosphoric acid-2,2'-methylenebis(4,6-di-t-butylphenyl)sodium salt, phosphoric acid-2,2'-methylenebis(4,6-di-tert-butylphenyl) aluminum salt, and phosphoric acid-2,2'-methylenebis(4,6-di-tert-butylphenyl)lithium salt. In some embodiments, the triaminobenzene derivative nucleating agents are 1,3,5-tris (2,2-dimethylpropanamide)benzene. In some embodiments, the metal carboxylate nucleating agents are selected from the group consisting of sodium adipate, potassium adipate, aluminum adipate, sodium sebacate, potassium sebacate, aluminum sebacate, sodium benzoate, aluminum benzoate, aluminum di-para-t-butylbenzoate, titanium di-para-t-butylbenzoate, chromium di-para-t-butylbenzoate, and aluminum hydroxy-di-t-butylbenzoate. In some embodiments, the xylitol nucleating agents are selected from the group consisting of bis-1,3:2,4-(5',6',7',8'-tetrahydro-2-naphthaldehydebenzylidene)-1-allyl-xylitol, and bis-1,3:2,4-(3',4'-dimethylbenzylidene)-1-propyl-xylitol. In some embodiments, the rosin-based nucleating agents are partial metal salts of rosin acid. In some embodiments, the partial metal salts of rosin acid are selected from the group consisting of partial sodium salt of rosinic acid, partial potassium salt of rosinic acid, and partial magnesium salt of rosinic acid. In some embodiments, the crystal nucleating agents are used alone or in combinations of two or more.

In some embodiments, the crystal nucleating agent is added through the use of a master batch made from or containing the crystal nucleating agent and an olefinic polymer. In some embodiments, the matrix polymer in the master batch is made from or containing component (1) or component (2). In some embodiments, the amount of the master batch and the concentration of the crystal nucleating agent in the master batch are adjusted to provide a weight ratio of component (1) to component (2) in the polypropylene composition within the following ranges. In some embodiments, the matrix polymer is not made from or containing component (1) or component (2) while the polypropylene composition is made from or containing the matrix polymer as any other component described below.

(4) Composition Ratio

In some embodiments, the relative ratio (weight ratio) of component (1) to component (2) is in the range of 80:20 to 90:10, alternatively in the range of 81:19 to 89:11, alternatively in the range of 83:17 to 89:11. When the content of component (1) exceeds the upper limit, a decrease in low temperature impact resistance occurs. When the content of component (1) falls below the lower limit, a decrease in not only transparency but also stiffness can occur.

In some embodiments, the content of the crystal nucleating agent is in the range of 0.01 to 0.5 parts by weight, alternatively in the range of 0.01 to 0.45 parts by weight, alternatively in the range of 0.015 to 0.45 parts by weight, based on the total content of components (1) and (2) (hereinafter also referred to as "resin components") which is 100 parts by weight. When no crystal nucleating agent is incorporated, no satisfactory transparency can be obtained, and moreover a decrease in stiffness occurs. Even when the crystal nucleating agent is incorporated in an amount exceeding the upper limit mentioned above, the crystal nucleation promoting effect reaches a plateau, merely resulting in an increase in production cost; so, it is not realistic to do so from the viewpoint of industrial production at large quantities and at low cost.

(4) Characteristic Features

1) XSIV

As used herein, the term "intrinsic viscosity of xylene solubles (XSIV) of the polypropylene composition" refers to an index for the molecular weight of a non-crystalline component in the composition. XSIV is determined by obtaining a component soluble in xylene at 25° C. and measuring the intrinsic viscosity of this component. In some embodiments, XSIV is in the range of 0.8 to 1.4 dl/g. When XSIV exceeds the upper limit, a decrease in transparency occurs. When XSIV falls below the lower limit, the polypropylene composition becomes difficult to produce. In some embodiments, XSIV is in the range of 0.8 to 1.3 dl/g.

2) MFR

In some embodiments, the MFR (melt mass-flow rate) of the polypropylene composition is in the range of 5 to 15 g/10 min., as measured at a temperature of 230° C. under a load of 2.16 kg. When MFR exceeds the upper limit, a decrease in low temperature impact resistance occurs. When MFR falls below the lower limit, injection molding becomes difficult for the polypropylene composition. In some embodiments, the MFR is in the range of 7 to 15 g/10 min. In some embodiments, the MFR of component (1) is determined after component (1) is synthesized separately.

3) Viscosity Ratio

As used herein, the term "viscosity ratio" is defined as a ratio of the XSIV of the polypropylene composition to the intrinsic viscosity of component (1). In some embodiments, the viscosity ratio is in the range of 0.40 to 0.80. This is a ratio of the intrinsic viscosity (IV) used as an index for the molecular weight of a non-crystalline component (XS) with respect to the intrinsic viscosity (IV) used as an index for the molecular weight of component (1) made from or containing a crystalline component. In some embodiments, a non-crystalline component corresponding to XS derived from component (2) forms a disperse phase in a matrix made from or containing a crystalline component derived from component (1). In some embodiments, the disperse phase is finely dispersed during a kneading process in a pelletizer or in an extruder of molding machine or the like. In some embodiments, the viscosity ratio is in the range of 0.45 to 0.75, alternatively 0.50 to 0.70.

In some embodiments, the intrinsic viscosity of component (1) is determined after component (1) is synthesized separately.

4) Structure

In some embodiments, the polypropylene composition has a phase structure wherein component (2) is dispersed in component (1).

(5) Other Components

In some embodiments, the polypropylene composition is further made from or containing additives. In some embodiments, the additives are selected from the group consisting of antioxidant, chlorine absorber, heat-resistant stabilizer, light stabilizer, ultraviolet absorber, internal lubricant, external lubricant, antiblocking agent, antistatic agent, antifogging agent, flame retardant, dispersant, copper inhibitor, neutralizer, plasticizer, foam inhibitor, crosslinking agent, peroxide, extender oil, and other organic and inorganic pigments. In some embodiments, the polypropylene composition is further made from or containing one or more types of resin or elastomer other than the resin components. In some embodiments, the crystal nucleating agent is added through the use of a master batch made from or containing the crystal nucleating agent and an olefinic polymer. In some embodiments, the matrix polymer in the master batch is different from components (1) and (2) and the polypropylene composition is further made from or containing the matrix polymer.

2. Production Method

In some embodiments, the components are obtained by a method including the step of polymerizing the starting monomers of components (1) and (2) using a catalyst made from or containing (a) a solid catalyst made from or containing magnesium, titanium, a halogen, and an internal electron donor compound, (b) an organoaluminum compound, and optionally (c) an external electron donor compound. In some embodiments, the internal electron donor compound is selected from the group consisting of succinate-based compounds, phthalate-based compounds, and diether-based compounds. In some embodiments, the internal electron donor compound is a succinate-based compound.

(1) Solid Catalyst (Component (a))

In some embodiments, component (a) is prepared by contacting a magnesium compound, a titanium compound, and an electron donor compound with each other.

In some embodiments, the titanium compound used to prepare component (a) is a tetravalent titanium compound represented by the general formula: $Ti(OR)_gX_{4-g}$. In this formula, R is a hydrocarbon group, X is a halogen, and $0 \leq g \leq 4$. In some embodiments, the titanium compound is selected from the group consisting of titanium tetrahalides, alkoxytitanium trihalides, alkoxytitanium dihalides, trialkoxytitanium monohalides, and tetraalkoxytitaniums. In some embodiments, the titanium tetrahalides are selected from the group consisting of $TiCl_4$, $TiBr_4$, and $TiI_4$. In some embodiments, the alkoxytitanium trihalides are selected from the group consisting of $Ti(OCH_3)Cl_3$, $Ti(OC_2H_5)Cl_3$, $Ti(O_n-C_4H_9)Cl_3$, $Ti(OC_2H_5)Br_3$, and $Ti(OisoC_4H_9)Br_3$. In some embodiments, the alkoxytitanium dihalides are selected from the group consisting of $Ti(OCH_3)_2Cl_2$, $Ti(OC_2H_5)_2Cl_2$, $Ti(O_n-C_4H_9)_2Cl_2$, and $Ti(OC_2H_5)_2Br_2$. In some embodiments, the trialkoxytitanium monohalides are selected from the group consisting of $Ti(OCH_3)_3Cl$, $Ti(OC_2H_5)_3Cl$, $Ti(O_n-C_4H_9)_3Cl$, and $Ti(OC_2H_5)_3Br$. In some embodiments, the tetraalkoxytitaniums are selected from the group consisting of $Ti(OCH_3)_4$, $Ti(OC_2H_5)_4$, and $Ti(O_n-C_4H_9)_4$. In some embodiments, the titanium compound is selected from the group consisting of halogen-containing titanium compounds, alternatively titanium tetrahalogenides, alternatively titanium tetrachlorides.

In some embodiments, the magnesium compound used to prepare component (a) is selected from the group consisting of magnesium compounds having a magnesium-carbon bond or a magnesium-hydrogen bond. In some embodiments, the magnesium compound having a magnesium-carbon bond or a magnesium-hydrogen bond is selected from the group consisting of dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, and butylmagnesium hydride. In some embodiments, the magnesium compounds are used in the form of a complex compound with an organoaluminum. In some embodiments, the magnesium compounds are used in liquid or solid form. In some embodiments, the magnesium compound is selected from the group consisting of magnesium halides, alkoxymagnesium halides, allyloxymagnesium halides, alkoxymagnesiums, allyloxymagnesiums, and magnesium carboxylates. In some embodiments, the magnesium compound is a magnesium halide selected from the group consisting of magnesium chloride, magnesium bromide, magnesium iodide, and magnesium fluoride. In some embodiments, the magnesium compound is an alkoxymagnesium halide selected from the group consisting of methoxymagnesium chloride, ethoxymagnesium chloride, isopropoxymagnesium chloride, butoxymagnesium chloride, and octoxymagnesium chloride. In some embodiments, the magnesium compound are allyloxymagnesium halide selected from the group consisting of phenoxymagnesium chloride and methylphenoxymagnesium chloride. In some embodiments, the magnesium compound is an alkoxymagnesium selected from the group consisting of ethoxymagnesium, isopropoxymagnesium, butoxymagnesium, n-octoxymagnesium, and 2-ethylhexoxymagnesium. In some embodiments, the magnesium compound is an allyloxymagnesium selected from the group consisting of phenoxymagnesium and dimethylphenoxymagnesium. In some embodiments, the magnesium compound is a magnesium carboxylate selected from the group consisting of magnesium laurate and magnesium stearate.

In some embodiments, the electron donor compound used to prepare component (a) is referred to as an "internal electron donor compound." In some embodiments, the internal electron donor compound provides a wide molecular weight distribution. In some embodiments, the molecular weight distribution values of components (1) and (2) are in the range of 6 to 20 as expressed by the index of Mw/Mn measured by GPC (gel permeation chromatography). In some embodiments, the Mw/Mn values are in the range of 7 to 20, alternatively in the range of 8 to 20, alternatively in the range of 9 to 20. In some embodiments, high-molecular-weight and low-molecular-weight components are integrated at a near-molecular level.

In some embodiments, the electron donor compounds are succinate-based compounds. As used herein, the "succinate-based compounds" refers to diesters of succinic acid or diesters of substituted succinic acid. In some embodiments, the succinate-based compounds are represented by formula (I):

[Chem. 1]

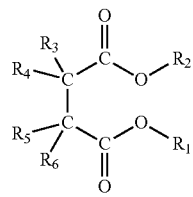

(I)

In this formula, the groups $R_1$ and $R_2$ are the same as or different from each other, and are each a $C_1$ to $C_{20}$ linear or branched alkyl, alkenyl, cycloalkyl, aryl, arylalkyl, or alkylaryl group optionally containing a heteroatom; and the groups $R_3$ to $R_6$ are the same as or different from each other, and are each a $C_1$ to $C_{20}$ linear or branched alkyl, alkenyl, cycloalkyl, aryl, arylalkyl, or alkylaryl group containing hydrogen or optionally containing a heteroatom. In some embodiments, the groups $R_3$ to $R_6$ attached to the same carbon atom or to different carbon atoms form a ring.

In some embodiments, $R_1$ and $R_2$ are $C_1$ to $C_8$ alkyl, cycloalkyl, aryl, arylalkyl, or alkylaryl groups. In some embodiments, $R_1$ and $R_2$ are selected from primary alkyls, alternatively branched primary alkyls. In some embodiments, the groups $R_1$ and $R_2$ are selected from $C_1$ to $C_8$ alkyl groups. In some embodiments, the $C_1$ to $C_8$ alkyl groups are selected from the group consisting of methyl, ethyl, n-propyl, n-butyl, isobutyl, neopentyl, and 2-ethylhexyl. In some embodiments, the $C_1$ to $C_8$ alkyl groups are selected from the group consisting of ethyl, isobutyl, and neopentyl.

In some embodiments, $R_3$ to $R_5$ are each hydrogen, and $R_6$ is a branched alkyl, cycloalkyl, aryl, arylalkyl, or alkylaryl group having 3 to 10 carbon atoms. In some embodiments, the monosubstituted succinate compounds are selected from the group consisting of diethyl-sec-butyl succinate, diethyl thexylsuccinate, diethyl cyclopropylsuccinate, diethyl norbornylsuccinate, diethyl perihydrosuccinate, diethyl trimethylsilylsuccinate, diethyl methoxysuccinate, diethyl-p-methoxyphenylsuccinate, diethyl-p-chlorophenylsuccinate, diethyl phenylsuccinate, diethyl cyclohexylsuccinate, diethyl benzylsuccinate, diethyl cyclohexylmethylsuccinate, diethyl-t-butylsuccinate, diethyl isobutylsuccinate, diethyl isopropylsuccinate, diethyl neopentylsuccinate, diethyl isopentylsuccinate, diethyl (1-trifluoromethylethyl)succinate, diethyl fluorenylsuccinate, 1-ethoxycarbo diisobutyl phenylsuccinate, diisobutyl-sec-butylsuccinate, diisobutyl thexylsuccinate, diisobutyl cyclopropylsuccinate, diisobutyl norbornylsuccinate, diisobutyl perihydrosuccinate, diisobutyl trimethylsilylsuccinate, diisobutyl methoxysuccinate, diisobutyl-p-methoxyphenylsuccinate, diisobutyl-p-chlorophenylsuccinate, diisobutyl cyclohexylsuccinate, diisobutyl benzylsuccinate, diisobutyl cyclohexylmethylsuccinate, diisobutyl-t-butylsuccinate, diisobutyl isobutylsuccinate, diisobutyl isopropylsuccinate, diisobutyl neopentylsuccinate, diisobutyl isopentylsuccinate, diisobutyl (1-trifluoromethylethyl)succinate, diisobutyl fluorenylsuccinate, dineopentyl-sec-butyl-succinate, dineopentyl thexylsuccinate, dineopentyl cyclopropylsuccinate, dineopentyl norbornylsuccinate, dineopentyl perihydrosuccinate, dineopentyl trimethylsilylsuccinate, dineopentyl methoxysuccinate, dineopentyl-p-methoxyphenylsuccinate, dineopentyl-p-chlorophenylsuccinate, dineopentyl phenylsuccinate, dineopentyl cyclohexylsuccinate, dineopentyl benzylsuccinate, dineopentyl cyclohexylmethylsuccinate, dineopentyl-t-butylsuccinate, dineopentyl isobutylsuccinate, dineopentyl isopropylsuccinate, dineopentyl neopentylsuccinate, dineopentyl isopentylsuccinate, dineopentyl (1-trifluoromethylethyl) succinate, and dineopentyl fluorenylsuccinate.

In some embodiments, at least two of the groups $R_3$ to $R_6$ are different from hydrogen, and are selected from $C_1$ to $C_{20}$ linear or branched alkyl, alkenyl, cycloalkyl, aryl, arylalkyl, or alkylaryl groups optionally containing a heteroatom. In some embodiments, the two groups different from hydrogen are attached to the same carbon atom. In some embodiments, $R_3$ and $R_4$ are groups different from hydrogen, and $R_5$ and $R_6$ are hydrogen atoms. In some embodiments, the disubstituted succinate compounds are selected from the group consisting of diethyl-2,2-dimethylsuccinate, diethyl-2-ethyl-2-methylsuccinate, diethyl-2-benzyl-2-isopropylsuccinate, diethyl-2-cyclohexylmethyl-2-isobutylsuccinate, diethyl-2-cyclopentyl-2-n-butylsuccinate, diethyl-2,2-diisobutylsuccinate, diethyl-2-cyclohexyl-2-ethylsuccinate, diethyl-2-isopropyl-2-methylsuccinate, diethyl-2-tetradecyl-2-ethylsuccinate, diethyl-2-isobutyl-2-ethylsuccinate, diethyl-2-(1-trifluoromethylethyl)-2-methylsuccinate, diethyl-2-isopentyl-2-isobutylsuccinate, diethyl-2-phenyl-2-n-butylsuccinate, diisobutyl-2,2-dimethylsuccinate, diisobutyl-2-ethyl-2-methylsuccinate, diisobutyl-2-benzyl-2-isopropylsuccinate, diisobutyl-2-cyclohexylmethyl-2-isobutylsuccinate, diisobutyl-2-cyclopentyl-2-n-butylsuccinate, diisobutyl-2,2-diisobutylsuccinate, diisobutyl-2-cyclohexyl-2-ethylsuccinate, diisobutyl-2-isopropyl-2-methylsuccinate, diisobutyl-2-tetradecyl-2-ethylsuccinate, diisobutyl-2-isobutyl-2-ethylsuccinate, diisobutyl-2-(1-trifluoromethylethyl)-2-methylsuccinate, diisobutyl-2-isopentyl-2-isobutylsuccinate, diisobutyl-2-phenyl-2-n-butylsuccinate, dineopentyl-2,2-dimethylsuccinate, dineopentyl-2-ethyl-2-methylsuccinate, dineopentyl-2-benzyl-2-isopropylsuccinate, dineopentyl-2-cyclohexylmethyl-2-isobutylsuccinate, dineopentyl-2-cyclopentyl-2-n-butylsuccinate, dineopentyl-2,2-diisobutylsuccinate, dineopentyl-2-cyclohexyl-2-ethylsuccinate, dineopentyl-2-isopropyl-2-methylsuccinate, dineopentyl-2-tetradecyl-2-ethylsuccinate, dineopentyl-2-isobutyl-2-ethylsuccinate, dineopentyl-2-(1-trifluoromethylethyl)-2-methylsuccinate, dineopentyl-2-isopentyl-2-isobutylsuccinate, and dineopentyl-2-phenyl-2-n-butylsuccinate.

In some embodiments, at least two groups different from hydrogen are attached to different carbon atoms. In some embodiments, $R_3$ and $R_5$ are groups different from hydrogen. In some embodiments, $R_4$ and $R_6$ are hydrogen atoms or groups different from hydrogen. In some embodiments, $R_4$ or $R_6$ is a hydrogen atom (trisubstituted succinates). In some embodiments, the compounds are selected from the group consisting of diethyl-2,3-bis(trimethylsilyl)succinate, diethyl-2,2-sec-butyl-3-methylsuccinate, diethyl-2-(3,3,3-trifluoropropyl)-3-methylsuccinate, diethyl-2,3-bis(2-ethylbutyl)succinate, diethyl-2,3-diethyl-2-isopropylsuccinate, diethyl-2,3-diisopropyl-2-methylsuccinate, diethyl-2,3-dicyclohexyl-2-methyldiethyl-2,3-dibenzylsuccinate, diethyl-2,3-diisopropylsuccinate, diethyl-2,3-bis(cyclohexylmethyl) succinate, diethyl-2,3-di-t-butylsuccinate, diethyl-2,3-diisobutylsuccinate, diethyl-2,3-dineopentylsuccinate, diethyl-2,3-diisopentylsuccinate, diethyl-2,3-(1-trifluoromethylethyl)succinate, diethyl-2,3-tetradecylsuccinate, diethyl-2,3-fluorenylsuccinate, diethyl-2-isopropyl-3-isobutylsuccinate, diethyl-2-tert-butyl-3-isopropylsuccinate, diethyl-2-isopropyl-3-cyclohexylsuccinate, diethyl-2-isopentyl-3-cyclohexylsuccinate, diethyl-2-tetradecyl-3-cyclohexylmethylsuccinate, diethyl-2-cyclohexyl-3-cyclopentylsuccinate, diisobutyl-2,3-diethyl-2-isopropylsuccinate, diisobutyl-2,3-diisopropyl-2-methylsuccinate, diisobutyl-2, 3-dicyclohexyl-2-methylsuccinate, diisobutyl-2,3-dibenzylsuccinate, diisobutyl-2,3-diisopropylsuccinate, diisobutyl-2,3-bis(cyclohexylmethyl)succinate, diisobutyl-2,3-di-t-butylsuccinate, diisobutyl-2,3-diisobutylsuccinate, diisobutyl-2,3-dineopentylsuccinate, diisobutyl-2,3-diisopentylsuccinate, diisobutyl-2,3-(1-trifluoromethylethyl)succinate, diisobutyl-2,3-tetradecylsuccinate, diisobutyl-2,3-fluorenylsuccinate, diisobutyl-2-isopropyl-3-isobutylsuccinate, diisobutyl-2-tert-butyl-3-isopropylsuccinate, diisobutyl-2-isopropyl-3-cyclohexylsuccinate, diisobutyl-2-isopentyl-3-cyclohexylsuccinate, diisobutyl-2-tetradecyl-3-cyclohexylmethylsuccinate, diisobutyl-2-cyclohexyl-3-cyclopentylsuccinate, dineopentyl-2,3-bis(trimethylsilyl)succinate, dineopentyl-2,2-sec-butyl-3-methylsuccinate, dineopentyl-2-(3,3,3-trifluoropropyl)-3-methylsuccinate, dineopentyl-2,3-bis(2-ethylbutyl)succinate, dineopentyl-2,3-diethyl-2-isopropylsuccinate, dineopentyl-2,3-diisopropyl-2-methylsuccinate, dineopentyl-2,3-dicyclohexyl-2-methylsuccinate, dineopentyl-2,3-dibenzylsuccinate, dineopentyl-2,3-diisopropylsuccinate, dineopentyl-2,3-bis(cyclohexylmethyl)succinate, dineopentyl-2,3-di-t-butylsuccinate, dineopentyl-2,3-diisobutylsuccinate, dineopentyl-2,3-dineopentylsuccinate, dineopentyl-2,3-diisopentylsuccinate, dineopentyl-2,3-(1-trifluoromethylethyl)succinate, dineopentyl-2,3-tetradecylsuccinate, dineopentyl-2,3-fluorenylsuccinate, dineopentyl-2-isopropyl-3-isobutylsuccinate, dineopentyl-2-tert-butyl-3-isopropylsuccinate, dineopentyl-2-isopropyl-3-cyclohexylsuccinate, dineopentyl-2-isopentyl-3-cyclohexylsuccinate, dineopentyl-2-tetradecyl-3-cyclohexylmethylsuccinate, and dineopentyl-2-cyclohexyl-3-cyclopentylsuccinate.

In some embodiments, some of the group $R_3$ to $R_6$ are joined together to forma ring. In some embodiments, the compounds are as described in International Patent Application Domestic Publication No. JP 2002-542347. In some embodiments, the compounds are selected from the group consisting of 1-(ethoxycarbonyl)-1-(ethoxyacetyl)-2,6-dimethylcyclohexane, 1-(ethoxycarbonyl)-1-(ethoxyacetyl)-2,5-dimethylcyclopentane, 1-(ethoxycarbonyl)-1-(ethoxyacetylmethyl)-2-methylcyclohexane, and 1-(ethoxycarbonyl)-1-(ethoxy(cyclohexyl)acetyl)cyclohexane. In some embodiments, the cyclic succinate compounds are as described in Patent Cooperation Treaty Publication No. WO 2009/069483. In some embodiments, the cyclic succinate compounds are selected from the group consisting of diisobutyl 3,6-dimethylcyclohexane-1,2-dicarboxylate and diisobutyl cyclohexane-1,2-dicarboxylate. In some embodiments, the cyclic succinate compounds are as described in Patent Cooperation Treaty Publication No. WO 2009/057747.

In some embodiments, the groups $R_3$ to $R_6$ contain a heteroatom. In some embodiments, the heteroatom is a Group 15 atom or a Group 16 atom. In some embodiments, the Group 15 atom is selected from the group consisting of nitrogen and phosphorus. In some embodiments, the Group 16 atom is selected from the group consisting of oxygen and sulfur. In some embodiments, the groups $R_3$ to $R_6$ contain a Group 15 atom are as described in Japanese Patent Application Publication No. JP 2005-306910. In some embodiments, the groups $R_3$ to $R_6$ contain a Group 16 atom are as described in Japanese Patent Application Publication No. JP 2004-131537.

In some embodiments, other internal electron donor compounds that provide a molecular weight distribution comparable to that provided by the succinate-based compounds are used. In some embodiments, the other compounds are selected from the group consisting of the diphenyl dicarboxylic acid esters described in Japanese Patent Application Publication No. JP 2013-28704, the cyclohexene dicarboxylic acid esters described in Japanese Patent Application Publication No. JP 2014-201602, the dicycloalkyl dicarboxylic acid esters described in Japanese Patent Application Publication No. JP 2013-28705, the diol dibenzoates described in Japanese Patent No. 4959920, and the 1,2-phenylene dibenzoates described in Patent Cooperation Treaty Publication No. WO 2010/078494.

(2) Organoaluminum Compound (Component (b))

In some embodiments, the organoaluminum compound as component (b) is selected from the group consisting of:
trialkylaluminums;
trialkenylaluminums;
dialkylaluminum alkoxides;
alkylaluminum sesquialkoxides;
partially halogenated alkylaluminums;
dialkylaluminum hydrides;
partially hydrogenated alkylaluminums; and
partially alkoxylated and halogenated alkylaluminums.

In some embodiments, the trialkylaluminum is selected from the group consisting of triethylaluminum and tributylaluminum. In some embodiments, the trialkenylaluminum is triisoprenylaluminum. In some embodiments, the dialkylaluminum alkoxides are selected from the group consisting of diethylaluminum ethoxide and dibutylaluminum butoxide. In some embodiments, the alkylaluminum sesquialkoxides are selected from the group consisting of ethylaluminum sesquiethoxide and butylaluminum sesquibutoxide. In some embodiments, the partially halogenated alkylaluminum is selected from the group consisting of alkylaluminum dihalogenides and alkylaluminum dihydrides. In some embodiments, the alkylaluminum dihalogenide is selected from the group consisting of ethylaluminum dichloride, propylaluminum dichloride, and butylaluminum dibromide. In some embodiments, the alkylaluminum dihydrides are selected from the group consisting of ethylaluminum dihydride and propylaluminum dihydride. In some embodiments, the dialkylaluminum hydrides are selected from the group consisting of diethylaluminum hydride and dibutylaluminum hydride. In some embodiments, the partially hydrogenated alkylaluminums are selected from alkylaluminum dihydrides. In some embodiments, the alkylaluminum dihydrides are selected from the group consisting of ethylaluminum dihydride and propylaluminum dihydride. In some embodiments, the partially alkoxylated and halogenated alkylaluminum is selected from the group consisting of ethylaluminum ethoxychloride, butylaluminum butoxychloride, and ethylaluminum ethoxybromide.

(3) Electron Donor Compound (Component (c))

As used herein, the electron donor compound as component (c) is referred to as an "external electron donor compound." In some embodiments, the catalyst is made from or contains component (c). In some embodiments, the catalyst is not made from or containing component (c).

In some embodiments, the electron donor compound is an organosilicon compound. In some embodiments, the organosilicon compound is selected from the group consisting of:
trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p- tolyldiethoxysilane, bis-ethylphenyldimethoxysilane, dicyclopentyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, thexyltrimethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(β-methoxyethoxysilane), vinyltriacetoxysilane, dimethyltetraethoxydisiloxane, methyl(3,3,3-trifluoro-n-propyl)dimethoxysilane, cyclohexylethyldimethoxysilane, cyclopentyl-t-butoxydimethoxysilane, diisobutyldimethoxysilane, isobutylisopropyldimethoxysilane, n-propyltrimethoxysilane, di-n-propyldimethoxysilane, texyltrimethoxysilane, t-butylethyldimethoxysilane, t-butylpropyldimethoxysilane, t-butyl-t-butoxydimethoxysilane, isobutyltrimethoxysilane, cyclohexylisobutyldimethoxysilane, di-sec-butyldimethoxysilane, isobutylmethyldimethoxysilane, bis(decahydroisoquinolin-2-yl)dimethoxysilane, diethylaminotriethoxysilane, dicyclopentyl-bis(ethylamino)silane, tetraethoxysilane, tetramethoxysilane, and isobutyltriethoxysilane.

In some embodiments, the organosilicon compound is selected from the group consisting of ethyltriethoxysilane, n-propyltriethoxysilane, n-propyltrimethoxysilane, t-butyltriethoxysilane, t-butylmethyldimethoxysilane, t-butylmethyldiethoxysilane, t-butylethyldimethoxysilane, t-butylpropyldimethoxysilane, t-butyl-t-butoxydimethoxysilane, t-butyltrimethoxysilane, i-butyltrimethoxysilane, isobutylmethyldimethoxysilane, i-butyl-sec-butyldimethoxysilane, ethyl(perhydroisoquinolin-2-yl)dimethoxysilane, bis(decahydroisoquinolin-2-yl)dimethoxysilane, tri(isopropenyloxy) phenylsilane, thexyltrimethoxysilane, vinyltriethoxysilane, phenyltriethoxysilane, phenyltrimethoxysilane, vinyltributoxysilane, diphenyldimethoxysilane, diisopropyldimethoxysilane, diisobutyldimethoxysilane, i-butyl-1-propyldimethoxysilane, cyclopentyl-t-butoxydimethoxysilane, dicyclopentyldimethoxysilane, cyclohexylmethyldimethoxysilane, cyclohexyl-1-butyldimethoxysilane, cyclopentyl-1-butyldimethoxysilane, cyclopentylisopropyldimethoxysilane, di-sec-butyldimethoxysilane, diethylaminotriethoxysilane, tetraethoxysilane, tetramethoxysilane, isobutyltriethoxysilane, phenylmethyldimethoxysilane, phenyltriethoxysilane, bis-p-tolyldimethoxysilane, p-tolylmethyldimethoxysilane, dicyclohexyldimethoxysilane, cyclohexylethyldimethoxysilane, 2-norbornanetriethoxysilane, 2-norbornanemethyldimethoxysilane, diphenyldiethoxysilane, methyl(3,3,3-trifluoropropyl)dimethoxysilane, ethyl silicate, and the like.

(4) Polymerization

The starting monomers are polymerized by contact with the catalyst. In some embodiments, the pre-polymerization is first performed using the catalyst. Pre-polymerization is a step in which a polymer chain serving as a foothold for subsequent polymerization of the starting monomers is formed on a solid catalyst component. In some embodiments, pre-polymerization is performed at not more than 40° C., alternatively at not more than 30° C., alternatively at not more than 20° C. Then, the pre-polymerized catalyst is introduced into a polymerization reaction system to perform polymerization of the starting monomers. In some embodiments, polymerization is performed by polymerizing the starting monomer of component (1) and the starting monomer of component (2) using two or more reactors. In some embodiments, polymerization is performed in a liquid phase, a gas phase, or a liquid/gas phase. In some embodiments, the polymerization temperature is in the range of normal temperature to 150° C., alternatively in the range of 40° C. to 100° C. In some embodiments, the polymerization pressure is in the range of 3.3 to 6.0 MPa for polymerization in a liquid phase, alternatively in the range of 0.5 to 3.0 MPa for polymerization in a gas phase. In some embodiments, a molecular weight regulator is used. In some embodiments, the molecular weight regulator is a chain transfer agent. In some embodiments, the chain transfer agent is hydrogen or $ZnEt_2$.

In some embodiments, a polymerization apparatus having gradients in monomer concentration or polymerization conditions is used. In some embodiments, the monomers are polymerized in a gas phase using an apparatus having at least two interconnected polymerization zones. In some embodiments and in the presence of a catalyst, monomers are fed to a first polymerization zone including a riser and are polymerized in the first polymerization zone, while monomers are also fed to second polymerization zone including a downcomer connected to the riser and are polymerized in the second polymerization zone, and then as the monomers are circulated between the riser and downcomer, a polymer product is collected. In some embodiments, this method prevents totally or partially a gas mixture present in the riser from entering the downcomer. In some embodiments, a gas or liquid mixture that is different in chemical constitution from the gas mixture present in the riser is introduced into the downcomer. In some embodiments, the polymerization method is as described in International Patent Application Domestic Publication No. JP 2002-520426.

3. Application

In some embodiments, the polypropylene composition is a resin composition for injection molding. In some embodiments, the polypropylene composition is injection-molded into a molded article having a thickness of 0.5 to 3 mm. In some embodiments, the polypropylene composition has the physical properties described below.

1) Haze: JIS K7136

In some embodiments, the polypropylene composition has a haze value of not more than 20%, alternatively not more than 15%, when the composition injection-molded into a 1 mm-thick flat plate is measured. In some embodiments, the lower limit of the haze value is not limited alternatively not less than about 1%.

2) Low Temperature Impact Resistance

In some embodiments, the polypropylene composition has a puncture resistance (at −20° C.) of not less than 15 J.

3) Stiffness

In some embodiments, the polypropylene composition has a flexural modulus of more than 800 MPa, alternatively not less than 820 MPa, alternatively not less than 830 MPa.

In some embodiments, the polypropylene composition is used for packaging application, as alternatively for containers and container lids used at low temperatures like −20° C. In some embodiments, the polypropylene composition is directly injection-molded into a final product. In some embodiments, the polypropylene composition is made into a thin-wall article such as sheet by extruding or injection-molding and then into a final product by providing the thin-wall article to a secondary processing such as vacuum forming or pressure forming. In some embodiments, the polypropylene composition is used for miscellaneous goods.

EXAMPLES

Example 1

A Ziegler-Natta catalyst was produced according to Example 1 of Patent Cooperation Treaty Publication No. WO 2009/050045. However, at the time of the first temperature elevation, the temperature was elevated to 110° C. instead of 100° C. The catalyst component was brought into contact with triethylaluminium (TEAL) and the external electron donor component, dicyclopentyldimethoxysilane (DCPMS), at 12° C. for 24 minutes. The weight ratio of TEAL to the solid catalyst component was 20, and the weight ratio of TEAL to DCPMS was 10. Before the catalyst system was introduced into a first-stage polymerization reactor, the catalyst system was subjected to pre-polymerization, while suspended in liquid propylene, at 20° C. for about 5 minutes. The resulting prepolymerized product was introduced into a first-stage polymerization reactor in a polymerization apparatus having two stages of polymerization reactors connected in series, and then ethylene was fed to the propylene in liquid phase, thereby producing a propylene/ethylene random copolymer as component (1). In a second-stage gas-phase polymerization reactor, ethylene and propylene were fed to produce an ethylene/propylene copolymer as component (2). During the polymerization, the temperature and pressure were adjusted, and hydrogen was used as a molecular weight regulator.

As for polymerization temperatures and relative proportions of reactants, the polymerization temperature, hydrogen concentration, and ethylene concentration in the first-stage reactor were 75° C., 0.46 mol. %, and 0.80 mol. %, respectively; and the polymerization temperature, H2/C2 molar ratio, and C2/(C2+C3) molar ratio in the second-stage reactor were 80° C., 0.56, and 0.71, respectively. Also, the residence time distributions at the first and second stages were adjusted, thereby ensuring that the amount of component (2) obtained was 13% by weight. To 100 parts by weight of the resulting resin components, 0.2 parts by weight of a crystal nucleating agent, 0.2 parts by weight of an antioxidant, and 0.05 parts by weight of a neutralizer were added. The crystal nucleating agent was Milliken Chemical's Millad 3988 sorbitol nucleating agent. The antioxidant was BASF's B225. The neutralizer was Tannan Kagaku Kogyo Co., Ltd.'s calcium stearate. The contents were stirred and mixed for 1 minute using a Henschel mixer. The mixture was extruded at a cylinder temperature of 230° C. using an NVC φ50 mm single-screw extruder produced by Nakatani Machinery Ltd., and the extruded strands were cooled in water and cut by a pelletizer to obtain a polypropylene composition in a pellet form. The results of evaluating the sample are shown in Table 1.

Example 2

A polypropylene composition was produced and evaluated by the same procedure as in Example 1, except that the hydrogen concentration in the first-stage reactor was changed to 0.41 mol. % and the H2/C2 and C2/(C2+C3) molar ratios in the second-stage reactor were changed to 0.65 and 0.79, respectively.

Example 3

A polypropylene composition was produced and evaluated by the same procedure as in Example 1, except that a Ziegler-Natta catalyst component was produced as described in European Patent No. EP 728769, Example 5, lines 48-55, the hydrogen and ethylene concentrations in the first-stage reactor were changed to 0.56 mol. % and 0.89 mol. %, respectively, and the H2/C2 and C2/(C2+C3) molar ratios in the second-stage reactor were changed to 0.48 and 0.69, respectively.

Example 4

A polypropylene composition was produced and evaluated by the same procedure as in Example 3, except that the hydrogen concentration in the first-stage reactor was changed to 0.48 mol. %, and the H2/C2 and C2/(C2+C3) molar ratios in the second-stage reactor were changed to 0.65 and 0.81, respectively.

Example 5

A polypropylene composition was produced and evaluated by the same procedure as in Example 3, except that the hydrogen and ethylene concentrations in the first-stage reactor were changed to 0.30 mol. % and 0.53 mol. %, respectively, the H2/C2 and C2/(C2+C3) molar ratios in the second-stage reactor were changed to 0.56 and 0.83, respectively, and the residence time distributions at the first and second stages were adjusted, thereby ensuring that the amount of component (2) obtained was 15% by weight.

Example 6

A polypropylene composition was produced and evaluated by the same procedure as in Example 4, except that the hydrogen concentration in the first-stage reactor was changed to 0.37 mol. %, and the C2/(C2+C3) molar ratio in the second-stage reactor was changed to 0.89.

Example 7

A polypropylene composition was produced and evaluated by the same procedure as in Example 3, except that the hydrogen concentration in the first-stage reactor was changed to 0.39 mol. %, the H2/C2 and C2/(C2+C3) molar ratios in the second-stage reactor were changed to 0.76 and 0.83, respectively, and the residence time distributions at the first and second stages were adjusted, thereby ensuring that the amount of component (2) obtained was 12% by weight.

Comparative Example 1

A polypropylene composition was produced and evaluated by the same procedure as in Example 1, except that the hydrogen and ethylene concentrations in the first-stage reactor were changed to 0.33 mol. % and 0.36 mol. %, respectively, the H2/C2 and C2/(C2+C3) molar ratios in the second-stage reactor were changed to 0.48 and 0.77, respectively, and the residence time distributions at the first and second stages were adjusted, thereby ensuring that the amount of component (2) obtained was 12% by weight.

Comparative Example 2

A polypropylene composition was produced and evaluated by the same procedure as in Example 1, except that the hydrogen and ethylene concentrations in the first-stage reactor were changed to 0.51 mol. % and 1.02 mol. %, respectively, and the C2/(C2+C3) molar ratio in the second-stage reactor was changed to 0.77. The polymer particles in the plant equipment easily adhered to each other or to an inner wall of the equipment during polymer production.

Comparative Example 3

A polypropylene composition was produced and evaluated by the same procedure as in Example 7, except that the hydrogen concentration in the first-stage reactor was changed to 0.42 mol. %, and in the second-stage reactor, 1-butene was fed instead of propylene and the H2/C2 and C2/(C2+C4) molar ratios were changed to 0.35 and 0.60, respectively. The productivity was lower than when using propylene in the second-stage reactor.

Comparative Example 4

A polypropylene composition was produced and evaluated by the same procedure as in Example 4, except that the hydrogen concentration in the first-stage reactor was changed to 0.46 mol. %, the C2/(C2+C3) molar ratio in the second-stage reactor was changed to 0.86, and the residence time distributions at the first and second stages were adjusted, thereby ensuring that the amount of component (2) obtained was 8% by weight.

Comparative Example 5

A polypropylene composition was produced and evaluated by the same procedure as in Example 1, except that the hydrogen and ethylene concentrations in the first-stage reactor were changed to 0.36 mol. % and 0.66 mol. %, respectively, and the residence time distributions at the first and second stages were adjusted, thereby ensuring that the amount of component (2) obtained was 23% by weight.

Comparative Example 6

A polypropylene composition was produced and evaluated by the same procedure as in Example 4, except that the H2/C2 and C2/(C2+C3) molar ratios in the second-stage reactor were changed to 0.56 and 0.64, respectively.

Comparative Example 7

A polypropylene composition was produced and evaluated by the same procedure as in Example 2, except that the hydrogen concentration in the first-stage reactor was changed to 0.35 mol. %, the C2/(C2+C3) molar ratio in the second-stage reactor was changed to 0.86, and the residence time distributions at the first and second stages were adjusted, thereby ensuring that the amount of component (2) obtained was 14% by weight.

Comparative Example 8

A polypropylene composition was produced and evaluated by the same procedure as in Example 7, except that the H2/C2 and C2/(C2+C3) molar ratios in the second-stage reactor were changed to 1.23 and 0.86, respectively. The XSIV value was close to the production threshold, adversely affecting the ability to obtain stably a polymer.

Comparative Example 9

A polypropylene composition was produced and evaluated by the same procedure as in Example 3, except that the H2/C2 and C2/(C2+C3) molar ratios in the second-stage reactor were changed to 0.14 and 0.76, respectively.

Comparative Example 10

A polypropylene composition was produced and evaluated by the same procedure as in Example 4, except that the hydrogen and ethylene concentrations in the first-stage reactor were changed to 0.11 mol. % and 0.84 mol. %, respectively, and the C2/(C2+C3) molar ratio in the second-stage reactor was changed to 0.81. The physical properties were not determined because the resulting composition was low in MFR and difficult to injection-mold.

Comparative Example 11

A polypropylene composition was produced and evaluated by the same procedure as in Comparative Example 6, except that the hydrogen concentration in the first-stage reactor was changed to 0.84 mol. %, and the C2/(C2+C3) molar ratio in the second-stage reactor was changed to 0.86.

Comparative Example 12

A polypropylene composition was produced and evaluated by the same procedure as in Example 1, except that the hydrogen concentration in the first-stage reactor was changed to 0.38 mol. %, the H2/C2 and C2/(C2+C3) molar ratios in the second-stage reactor were changed to 0.48 and 0.77, respectively, and no crystal nucleating agent was added.

Comparative Example 13

A comparative polypropylene composition was produced and evaluated according to the procedure described in Example 1 of International Patent Application Domestic Publication No. JP 2013-507497.

[Measurement Conditions]

1) MFR

MFR measurement was done at a temperature of 230° C. under a load of 2.16 kg according to JIS K7210-1.

2) Ethylene-Derived Unit Content in Component (1) and Ethylene-Derived Unit Content in Component (2)

The samples were dissolved in a mixed solvent of 1,2,4-trichlorobenzene and deuterated benzene, and measured for these contents by the $^{13}$C-NMR method using JNM LA-400 ($^{13}$C resonant frequency: 100 MHz) produced by JEOL Ltd.

3) Intrinsic Viscosity of Xylene Solubles (XSIV) of Polypropylene Composition

Xylene solubles were obtained from the polypropylene resin samples and measured for their intrinsic viscosity (XSIV) by following the procedure described below.

First, 2.5 g of a polypropylene sample was put into a flask containing 250 mL of o-xylene (solvent), and the contents were stirred at 135° C. for 30 minutes under nitrogen purging using a hot plate and a reflux condenser, whereby the composition was dissolved completely; thereafter, the solution was cooled at 25° C. for one hour. The resulting solution was filtered through paper filter. 100 mL of the filtrate obtained after filtration was collected, transferred to an aluminum cup, evaporated to dryness at 140° C. under nitrogen purging, and left to stand at room temperature for 30 minutes, whereby xylene solubles were obtained.

Intrinsic viscosity measurement was done in tetrahydronaphthalene at 135° C. using an automatic capillary viscometer (SS-780-H1, produced by Shibayama Scientific Co., Ltd.).

4) Intrinsic Viscosity (IV) of Component (1)

Component (1) was separately synthesized under the conditions for the first-stage reactor, and measured for intrinsic viscosity (IV) in tetrahydronaphthalene at 135° C. using an automatic capillary viscometer (SS-780-H1, produced by Shibayama Scientific Co., Ltd.).

5) Haze

A flat plate of 100 mm×100 mm×0.5 mm was made from each of the polypropylene composition samples using an injection molding machine (FANUC ROBOSHOT α100C produced by Fanuc Corporation) under the following conditions: molten resin temperature, 250° C.; mold temperature, 40° C.; average injection speed, 35 mm/sec.; hold pressure time, 5 sec.; and total cycle time, 43 sec. The haze of the test pieces was measured by a haze meter (HM-150 produced by Murakami Color Research Laboratory Co., Ltd.) according to JIS K7136.

6) Puncture Resistance

A flat plate of 130 mm×130 mm×2.0 mm was made from the polypropylene composition samples using an injection molding machine (FANUC ROBOSHOT α100C produced by Fanuc Corporation) under the following conditions: molten resin temperature, 230° C.; mold temperature, 40° C.; average injection speed, 35 mm/sec.; hold pressure time, 10 sec.; and total cycle time, 45 sec. With the use of Hydroshot HITS-P10 produced by Shimadzu Corporation, each test piece for measurement was placed on a support with a hole of 40 mmφ internal diameter in a thermostatic bath controlled at −20° C., secured with a sample holder of 76 mmφ internal diameter, and then struck by a striker of 12.7 mmφ diameter with a hemispherical striking face at an impact velocity of 1 m/sec., thereby determining puncture energy (J) according to JIS K7211-2. An average of the puncture energy values obtained for four test pieces was calculated as a puncture resistance and used as an index for low temperature impact resistance.

7) Blush Resistance

After the samples were tested for puncture resistance at 0° C., the tested samples were visually observed to see if the samples were whitened, and evaluated based on the following criteria.

A: Not whitened
X: Whitened

8) Flexural Modulus

According to JIS K6921-2, multi-purpose test pieces (type A1) as per JIS K7139 were injection-molded from the polypropylene composition samples using an injection molding machine (FANUC ROBOSHOT S2000i produced by Fanuc Corporation) under the following conditions: molten resin temperature, 200° C.; mold temperature, 40° C.; average injection speed, 200 mm/sec.; hold pressure time, 40 sec.; and total cycle time, 60 sec. The injection-molded samples were processed into a dimension of 10 mm wide, 4 mm thick and 80 mm long to obtain test pieces (type B2) for measurement. The type B2 test pieces were measured for flexural modulus using a precision universal testing machine (Autograph AG-X 10 kN) produced by Shimadzu Corporation under the following conditions: temperature, 23° C.; relative humidity, 50%; length of span between supports, 64 mm; and test speed, 2 mm/min.

9) Spiral Flow

Molding flowability was evaluated by spiral flow testing.

The values of spiral flow were determined by measuring the flow length of injection-molded articles obtained using an injection molding machine (α100C produced by Fanuc Corporation) equipped with a spiral flow mold (flow path cross-sectional profile: a trapezoid with an upper base length of 9.5 mm, a lower base length of 10 mm, and a height of 1 mm) having an Archimedes spiral formed thereon. The molding conditions were as follows.

Cylinder temperature: 250° C.
Mold temperature: 40° C.
Injection pressure: 76.5 MPa
Injection speed: 10 mm/sec.
Hold pressure: 73.5 to 74.5 MPa (for 3 sec.)
Cooling time: 10 sec.

10) Ease of Production

The ease of production of the polypropylene composition samples in a polymer production plant was evaluated based on the following criteria.

A: Comparable to conventional polypropylene compositions
B: Inferior to conventional polypropylene compositions
C: Difficult to produce industrially
D: Unable to produce industrially

TABLE 1

| | Examples | | | | | | |
|---|---|---|---|---|---|---|---|
| | 1 | 2 | 3 | 4 | 5 | 6 | 7 |
| Catalyst [1] | Suc | Suc | Ph | Ph | Ph | Ph | Ph |
| Ethylene content in component (1) (wt. %) | 3.4 | 3.4 | 3.5 | 3.4 | 2.0 | 3.4 | 3.5 |
| IV of component (1) (dL/g) | 1.5 | 1.6 | 1.6 | 1.6 | 1.7 | 1.7 | 1.7 |
| MFR of component (1) (g/10 min) | 12 | 10 | 11 | 9.5 | 6.9 | 6.9 | 7.6 |
| Type of component (2) [2] | C2C3 | C2C3 | C2C3 | C2C3 | C2C3 | C2C3 | C2C3 |
| Content of component (2) (wt. %) | 13 | 13 | 13 | 13 | 15 | 13 | 12 |
| Ethylene content in component (2) (wt. %) | 75 | 83 | 69 | 80 | 81 | 86 | 81 |
| XSIV (dL/g) | 1.1 | 1.0 | 1.2 | 1.0 | 1.1 | 1.0 | 0.9 |
| MFR (g/10 min) | 14 | 13 | 13 | 12 | 9 | 9 | 10 |
| Viscosity ratio | 0.73 | 0.63 | 0.75 | 0.63 | 0.65 | 0.59 | 0.53 |

TABLE 1-continued

| | | | | | | | |
|---|---|---|---|---|---|---|---|
| Crystal nucleating agent Millad 3988 (parts by wt.) | 0.2 | 0.2 | 0.2 | 0.2 | 0.2 | 0.2 | 0.2 |
| Ease of production | A | A | A | A | A | A | A |
| Haze (%) | 11 | 12 | 13 | 13 | 15 | 14 | 11 |
| Puncture resistance @ −20° C. (J) | 29 | 29 | 24 | 19 | 20 | 19 | 22 |
| Flexural modulus (MPa) | 830 | 840 | 880 | 910 | 1100 | 900 | 860 |
| Blush resistance | A | A | A | A | A | A | A |
| Spiral flow (cm) | 26.7 | 26.3 | 25.2 | 24.6 | 23.1 | 23.0 | 23.6 |

| | Comparative Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Catalyst [1] | Suc | Suc | Ph | Ph | Suc | Ph | Suc | Ph | Ph | Ph | Ph | Suc | Ph |
| Ethylene content in component (1) (wt. %) | 1.5 | 4.3 | 3.5 | 3.5 | 2.5 | 3.5 | 3.5 | 3.4 | 3.5 | 3.3 | 3.5 | 3.4 | 3.2 |
| IV of component (1) (dL/g) | 1.6 | 1.6 | 1.7 | 1.6 | 1.6 | 1.6 | 1.7 | 1.7 | 1.5 | 2.2 | 1.4 | 1.7 | 1.4 |
| MFR of component (1) (g/10 min) | 11 | 11 | 8.1 | 8.6 | 11 | 9.9 | 7.6 | 7.6 | 12 | 2.1 | 19 | 8.4 | 20 |
| Type of component (2) [2] | C2C3 | C2C3 | C2C4 | C2C3 | C2C3 | C2C3 | C2C3 | C2C3 | C2C3 | C2C3 | C2C3 | C2C3 | C2C3 |
| Content of component (2) (wt. %) | 12 | 13 | 12 | 8 | 23 | 13 | 14 | 12 | 13 | 13 | 13 | 13 | 15 |
| Ethylene content in component (2) (wt. %) | 81 | 80 | 81 | 82 | 74 | 64 | 89 | 83 | 74 | 79 | 82 | 81 | 80 |
| XSIV (dl/g) | 1.2 | 1.1 | 0.8 | 1.0 | 1.1 | 1.1 | 1.0 | 0.6 | 2.0 | 1.0 | 1.1 | 1.2 | 1.2 |
| MFR (g/10 min) | 13 | 13 | 11 | 10 | 15 | 12 | 10 | 11 | 10 | 3 | 22 | 10 | 22 |
| Viscosity ratio | 0.75 | 0.69 | 0.47 | 0.63 | 0.69 | 0.69 | 0.59 | 0.35 | 1.33 | 0.45 | 0.79 | 0.71 | 0.86 |
| Crystal nucleating agent Millad 3988 (parts by wt.) | 0.2 | 0.2 | 0.2 | 0.2 | 0.2 | 0.2 | 0.2 | 0.2 | 0.2 | 0.2 | 0.2 | — | 0.18 (wt %) |
| Ease of production | A | D | B | A | A | A | A | C | A | A | A | A | A |
| Haze (%) | 12 | — | 10 | 9 | 25 | 22 | 18 | 10 | 87 | — | 13 | 26 | 16 |
| Puncture resistance @ −20° C. (J) | 12 | — | 22 | 8 | 30 | 26 | 13 | 12 | 11 | — | 13 | 26 | 20 |
| Flexural modulus (MPa) | 1340 | — | 850 | 920 | 910 | 860 | 920 | 850 | 800 | — | 890 | 750 | 800 |
| Blush resistance | A | — | A | A | A | A | A | A | A | — | A | A | A |
| Spiral flow (cm) | 26.4 | — | 24.2 | 23.7 | 27.2 | 24.5 | 24.9 | 24.2 | 23.6 | 16.8 | 28.1 | 24.7 | 28.5 |

[1] Suc: Catalyst using a succinate compound Ph: Catalyst using a phthalate compound
[2] C2C3: Ethylene/propylene copolymer C2C4: Ethylene/1-butene copolymer As shown in Table 1, the polypropylene composition of the present invention is excellent in a balance between transparency, low temperature impact resistance and stiffness. Further, the polypropylene composition of this invention is excellent in ease of production and thus advantageous from an economical point of view.

What is claimed is:

1. A polypropylene composition comprising:
   (i) component (1) comprising a propylene/ethylene copolymer containing more than 1.5% by weight and not more than 4% by weight of an ethylene-derived unit, based upon the total weight of the propylene/ethylene copolymer;
   (ii) component (2) comprising an ethylene/propylene copolymer containing 65 to 87% by weight of an ethylene-derived unit, based upon the total weight of the ethylene/propylene copolymer;
   (iii) 0.01 to 0.5 parts by weight of a crystal nucleating agent, based on a total of 100 parts by weight of component (1) and component (2);

wherein the polypropylene composition has
   1) a weight ratio of component (1) to component (2) is in the range of 80:20 to 90:10,
   2) an intrinsic viscosity, measured in tetrahydronaphthalene at 135° C., of xylene solubles (XSIV) in the range of 0.8 to 1.4 dl/g,
   3) a MFR (at 230° C. under a load of 2.16 kg) in the range of 5 to 15 g/10 min., and
   4) as determined by the following equation, a viscosity ratio in the range of 0.40 to 0.80:

$$\text{Viscosity ratio} = \frac{XSIV}{\text{Intrinsic viscosity of component (1)}}.$$

2. The polypropylene composition according to claim 1, wherein the ethylene-derived unit in component (1) is present at a concentration of 1.8 to 4% by weight, based upon the total weight of the propylene/ethylene copolymer.

3. The polypropylene composition according to claim 1, wherein the viscosity ratio is in the range of 0.45 to 0.75.

4. The polypropylene composition according to claim 1, wherein components (1) and (2) are copolymers obtained by polymerizing propylene and ethylene using a catalyst comprising:
   (a) a solid catalyst comprising magnesium, titanium, a halogen, and an electron donor compound selected from succinate-based compounds, and
   (b) an organoaluminum compound and
   (c) optionally an external electron donor compound.

5. An injection-molded article comprising the polypropylene composition according to claim 1.

* * * * *

UNITED STATES PATENT AND TRADEMARK OFFICE
CERTIFICATE OF CORRECTION

| | | |
|---|---|---|
| PATENT NO. | : 11,339,280 B2 | Page 1 of 1 |
| APPLICATION NO. | : 16/981217 | |
| DATED | : May 24, 2022 | |
| INVENTOR(S) | : Tsukahara et al. | |

It is certified that error appears in the above-identified patent and that said Letters Patent is hereby corrected as shown below:

In the Specification

In Column 9, Line 35, delete "forma" and insert -- form a --, therefor

Signed and Sealed this
Thirteenth Day of February, 2024

Katherine Kelly Vidal
*Director of the United States Patent and Trademark Office*